(12) United States Patent
Elbaum et al.

(10) Patent No.: US 12,059,891 B2
(45) Date of Patent: Aug. 13, 2024

(54) AUTONOMOUSLY MOVING MULTIFUNCTIONAL ROBOTIC DEVICE WITH PRINTER

(71) Applicant: ZUtA Labs Ltd, Jerusalem (IL)

(72) Inventors: Tuvia Elbaum, Jerusalem (IL); Yitzi Kempinski, Geva Binyamin (IL); Matan Caspi, Jerusalem (IL)

(73) Assignee: ZUtA Labs Ltd, Jerusalem (IL)

( * ) Notice: Subject to any disclaimer, the term of this patent is extended or adjusted under 35 U.S.C. 154(b) by 180 days.

(21) Appl. No.: 17/769,788

(22) PCT Filed: Oct. 19, 2020

(86) PCT No.: PCT/IB2020/059817
§ 371 (c)(1),
(2) Date: Apr. 18, 2022

(87) PCT Pub. No.: WO2021/074906
PCT Pub. Date: Apr. 22, 2021

(65) Prior Publication Data
US 2022/0379636 A1    Dec. 1, 2022

Related U.S. Application Data (60) Provisional application No. 62/916,283, filed on Oct. 17, 2019.

(51) Int. Cl.
*B41J 3/36* (2006.01)
*B41J 11/66* (2006.01)
*G05D 1/00* (2006.01)

(52) U.S. Cl.
CPC ............. *B41J 11/663* (2013.01); *B41J 3/36* (2013.01); *G05D 1/0016* (2013.01)

(58) Field of Classification Search
CPC ... B41J 3/28; B41J 3/36; B41J 11/663; G05D 1/0016; G05D 1/0234; B05B 13/005
See application file for complete search history.

(56) References Cited

U.S. PATENT DOCUMENTS

| 3,789,947 A | 2/1974 | Blumrich |
| 5,170,352 A | 12/1992 | McTamaney et al. |

(Continued)

FOREIGN PATENT DOCUMENTS

| JP | 2003-291420 | 10/2003 |
| JP | 04-355167 | 12/2009 |

(Continued)

OTHER PUBLICATIONS

International Search Report and the Written Opinion Dated Aug. 2, 2021 From the International Searching Authority Re. Application No. PCT/IB2020/059817. (17 Pages).

(Continued)

*Primary Examiner* — Christopher E Mahoney
*Assistant Examiner* — Marissa Ferguson-Samreth (57) ABSTRACT

An autonomous moving apparatus includes a handheld housing adapted to contain a printing head, an actuating mechanism adapted to move the housing on top of a printing surface, an audio sensor, and at least one non-audio sensor selected from a group comprising a distance sensor, a touch sensor, and an image sensor. Processing circuitry is adapted to execute a code for analyzing an audio signal captured by the audio sensor to detect a voice command; in response to the detection of the voice command, analyzing readings of at least one non-audio sensor to identify a triggering event; in response to the detection of the triggering event, instructing the actuating mechanism such that the housing moves along a printing pattern associated with the triggering event, and instructing the printing head to print media extracted (Continued)

from the readings, selected according to an analysis of the readings.

19 Claims, 8 Drawing Sheets

(56) References Cited

U.S. PATENT DOCUMENTS

| | | | |
|---|---|---|---|
| 5,825,995 | A | 10/1998 | Wiklof et al. |
| 6,116,707 | A | 9/2000 | Avida |
| 6,543,874 | B2 | 4/2003 | Matsumoto |
| 6,695,445 | B2 | 2/2004 | Hagstrom et al. |
| 6,729,706 | B1 | 5/2004 | Patton et al. |
| 7,245,760 | B2 | 7/2007 | Yourlo et al. |
| D736,312 | S | 8/2015 | Elbaum et al. |
| 9,221,506 | B1 | 12/2015 | Georgeson et al. |
| 2002/0067382 | A1 | 6/2002 | Vega et al. |
| 2002/0158955 | A1 | 10/2002 | Hess et al. |
| 2009/0040286 | A1 | 2/2009 | Tan et al. |
| 2010/0049388 | A1 | 2/2010 | Moriguchi et al. |
| 2011/0098858 | A1 | 4/2011 | Yourlo et al. |
| 2012/0092724 | A1 | 4/2012 | Pettis |
| 2013/0024067 | A1 | 1/2013 | Troy et al. |
| 2014/0209020 | A1 | 7/2014 | Burke |
| 2016/0311239 | A1 | 10/2016 | Elbaum et al. |

FOREIGN PATENT DOCUMENTS

| | | |
|---|---|---|
| KR | 10-2157637 | 8/2014 |
| TW | 200827181 | 7/2008 |
| WO | WO 2021/074906 | 4/2021 |

OTHER PUBLICATIONS

Invitation to Pay Additional Fees Dated May 5, 2021 From the International Searching Authority Re. Application No. PCT/IB2020/059817. (69 Pages) (Part 1).

Invitation to Pay Additional Fees Dated May 5, 2021 From the International Searching Authority Re. Application No. PCT/IB2020/059817. (69 Pages) (Part2).

Invitation to Pay Additional Fees Dated May 5, 2021 From the International Searching Authority Re. Application No. PCT/IB2020/059817. (69 Pages) (Part 3).

AUTONOMOUSLY MOVING MULTIFUNCTIONAL ROBOTIC DEVICE WITH PRINTER

RELATED APPLICATIONS

This Application is a National Phase of PCT Patent Application No. PCT/IB2020/059817 having International filing date of Oct. 19, 2020, which claims priority under 35 USC § 119(e) of U.S. Provisional Application No. 62/916, 283 filed on Oct. 17, 2019. The contents of the above applications are all incorporated by reference as if fully set forth herein in their entirety.

BACKGROUND

The present invention, in some embodiments, relates to an autonomous moving apparatus, and more specifically, but not exclusively, to an autonomously moving personal robotic device that is capable of moving and printing on a surface.

Electronic personal assistants, also known as "smart speakers," are widely available. These electronic personal assistants listen to a user's vocal instructions, and carry out tasks either through a built-in speaker (e.g., informing the user of the weather forecast), or through a networked connection to a different device (e.g., turning out the lights). Electronic personal assistants are constrained by two main limitations. First, they are immobile, and thus can affect remotely situated items only via a networked connection. Second, electronic personal assistants are typically able to handle only voice-based tasks, and cannot perform mechanical tasks.

A self-propelled printer and self-propelled imprinter are disclosed in U.S. Patent Publication 2016/0311239A1, the contents of which are incorporated by reference as if fully set forth herein. A self-propelled printer is capable of receiving data for printing via a wireless network connection, autonomously positioning itself on a surface, and printing an image on the surface. The self-propelled printer and imprinter described in the above-referenced publication are limited to the sole functions of printing and imprinting.

SUMMARY

Existing products do not provide an electronic personal assistant that is capable of assisting the user with tasks beyond those which can be performed based on voice commands and speakers. Existing products also do not integrate voice and speaker-based commands with autonomous printing. There is accordingly a need for a handheld, mobile, autonomous, personal assistant device, which is capable of carrying out multiple tasks for the user, including printing.

The present disclosure, in certain embodiments, discloses a multifunctional personal robotic device that is both mobile and adaptive. The robotic device includes a sensor array, featuring a distance sensor, a touch sensor, an audio sensor, and an image sensor. The robotic device also has various modular ports capable of receiving therein tools for performing various functions. The robotic device is able to use both its mobility and its array of sensors in order to improve the performance of these functions. For example, a processing circuitry receives information, such as a song to play, data for printing, a direction for movement, or a request to capture a picture. The processing circuitry may receive this information via a voice command from a user, or another input method, such as a data connection from an application on a computing device, or a hand gesture. The processing circuitry may also be programmed to perform certain of these functions autonomously, without receipt of a command. The processing circuitry causes the robotic device to move in a particular way, in order to carry out the task it has been requested to complete. For example, the robotic device moves closer to a user prior to playing a song, moves to a printing start location prior to printing and continue to move on a surface during printing, or moves to place a subject in focus prior to capturing an image with a camera.

In this manner, the robotic device functions as an autonomous personal assistant. The robotic device is small enough to fit on a table or desk, and includes functions that are available in other, stationary devices, such as a voice assistant or a smart speaker. The robotic device also has the ability to move in an autonomous manner, to print, and also carry out other tasks for the user, that are not voice based, rather are based on mechanical design and additional hardware, that may be installed with tool cartridges and modular devices.

According to a first aspect, an autonomous moving apparatus is disclosed. The autonomous moving apparatus includes a handheld housing adapted to contain a printing head, an actuating mechanism adapted to move the housing on top of a printing surface, an audio sensor, and at least one non-audio sensor selected from a group comprising a distance sensor, a touch sensor, and an image sensor. Processing circuitry is adapted to execute a code for analyzing an audio signal captured by the audio sensor to detect a voice command; in response to the detection of the voice command, analyzing readings of at least one non-audio sensor to identify a triggering event; in response to the detection of the triggering event, instructing the actuating mechanism such that the housing moves along a printing pattern associated with the triggering event, and instructing the printing head to print media extracted from the readings, selected according to an analysis of the readings.

Advantageously, the autonomous moving apparatus is thus capable of not only printing data that is passively sent to it via a network connection, but also of collecting readings from its sensors, and, in response to a voice command, printing media extracted from the sensor readings. As a result, the apparatus is able to create the data associated with the images that it prints. Furthermore, the identification of a triggering event enables the apparatus to identify media to print in an automated fashion, from among its various sensor readings. The apparatus is compact, and it is able to move autonomously in order to position its sensors and in order to print on a desired location on a printing surface.

In another implementation according to the first aspect, the processing circuitry is adapted to identify a previously printed image on the printing surface based on readings from the at least one non-audio sensor, and to autonomously position the apparatus so as to align the printed media in relation to the previously printed image. For example, the printed media may be an addition to a previously existing image. The processing circuitry may utilize readings from an image sensor to identify the previously existing image and locate it on the printing surface. The resulting image is thus printed precisely and without potential for error resulting from manual placement of the apparatus on the printing surface.

In another implementation according to the first aspect, the processing circuitry is configured to identify a print start location on the printing surface based on readings from the at least one non-audio sensor and to autonomously reposition the apparatus to the print start location prior to printing the media. For example, when the desired image is to be printed in the center of a page, the apparatus may move itself to the center of the page, prior to the start of printing. The resulting image is thus printed precisely and without potential for error resulting from manual placement of the apparatus on the printing surface.

In another implementation according to the first aspect, the triggering event is capturing of an image with the image sensor. For example, when a voice command is received to print an image, the processing circuitry identifies the most recently captured image, and selects it for printing. Advantageously, the apparatus is thus able to integrate the capturing of images with its printing function, without requiring an external data source for supplying the image to be printed.

In another implementation according to the first aspect, the triggering event is capturing an image of a blank signature line on a document, and the printed media comprises a signature. The apparatus is thus capable of recognizing a location on a page for a signature, and of printing the signature at the correct location.

In another implementation according to the first aspect, the triggering event is detection by the at least one non-audio sensor of placement of the autonomous moving apparatus onto the printing surface. The placement of the apparatus onto a printing surface thus serves as a kind of wake-up alert to the apparatus, to be prepared to print material that was recently sent to it or recently imaged. Optionally, the triggering event is detection of placement of the autonomous moving apparatus onto the printing surface within a predetermined time following capturing of an image with the image sensor. In such cases, the placement of the apparatus onto the printing surface soon after capturing an image specifically indicates to the apparatus to be prepared to print the captured image. In some such embodiments, the apparatus prints the captured image even without a command by the user.

In another implementation according to the first aspect, the processing circuitry is further adapted to execute a code for: in response to a voice command instructing capturing an image of an object with the image sensor, locating the object, determining whether the image sensor is capable of imaging the object at a desired size and resolution from its position, and, upon a determination that the image sensor is not able to image the object at the desired size and resolution, autonomously repositioning the autonomous moving apparatus prior to capturing the image. Advantageously, the apparatus autonomously moves in order to obtain a shot of the desired size and resolution, without requiring the user to reposition the apparatus manually.

In another implementation according to the first aspect, the media is a plurality of markings on the printing surface, and each respective pair of markings from the plurality of markings is separated by the same interval. In some such implementations, the distance sensor is used to measure distances, and the printing head is used to mark off the distances. Advantageously, the apparatus is thus able to accurately measure and mark distances, providing an additional useful function.

In another implementation according to the first aspect, a non-transitory computer-readable medium comprises computer-executable instructions for selecting an image to be printed from a memory of a computing device; requesting from a user whether to print the image; and, upon receipt of an instruction from the user to print the image, printing the image with the autonomous moving apparatus. In such implementations, the apparatus may be connected via a wireless network to an application installed on the computing device. However, rather than using the wireless network only for passive transmission of instructions to print an image, the application takes an active role in identifying content to be printed, thereby saving the user time and mental effort.

Optionally, the computer-executable instructions are for selecting the image based on at least one of temporal proximity to acquisition of the image by the computing device and temporal proximity to an electronic calendar entry associated with the image. In the first scenario, the application recognizes acquisition of the image, for example, through either capture of the image by a built-in camera of the computing device or through receipt of the image by electronic communication. The application identifies the image as a recently captured image and prompts the user whether he or she wishes to print it. In the second scenario, the application is integrated with a calendar function on the computing device. The application recognizes an image associated with a calendar event and prompts the user whether he or she wishes to print it.

Optionally, the computer-executable instructions are for selecting the image based on display of the image on a display of the computing device. For example, opening an image to full screen may signal to the application that the user may be interested in printing the image. The application accordingly prompts the user.

Optionally, the computer-executable instructions are for selecting the image based on an instruction from the user. For example, the user may issue a voice command or a command from a keyboard to print a particular image.

According to a second aspect, a method of printing with an autonomous moving apparatus is disclosed. The autonomous moving apparatus includes a handheld housing adapted to contain a printing head, an actuating mechanism adapted to move the housing on top of a printing surface, an audio sensor, and at least one non-audio sensor selected from a group comprising a distance sensor, a touch sensor, and an image sensor. The method comprises: analyzing an audio signal captured by the audio sensor to detect a voice command; in response to the detection of the voice command, analyzing readings of at least one non-audio sensor to identify a triggering event; in response to the detection of the triggering event, instructing the actuating mechanism such that the housing moves along a printing pattern associated with the triggering event; and instructing the printing head to print media extracted from the readings, selected according to an analysis of the readings.

Advantageously, in the performance of the method, the autonomous moving apparatus is not limited to printing media that is passively sent to it via a network connection, but rather collects readings from its sensors, and, in response to a voice command, prints media extracted from the sensor readings. As a result, the apparatus creates the data associated with the images that it prints. Furthermore, the identification of a triggering event enables the apparatus to identify media to print in an automated fashion, from among its various sensor readings. The apparatus is compact, and it is able to move autonomously in order to position its sensors and in order to print on a desired location on a printing surface.

In another implementation according to the second aspect, the method further comprises identifying a previously printed image on the printing surface based on readings from the at least one non-audio sensor, and autonomously positioning the autonomous moving apparatus so as to align the printed media in relation to the previously printed image.

For example, the printed media may be an addition to a previously existing image. The method may include, for example, utilizing readings from an image sensor to identify the previously existing image and locate it on the printing surface. The resulting image is thus printed precisely and without potential for error resulting from manual placement of the apparatus on the printing surface.

In another implementation according to the second aspect, the method further comprises identifying a print start location on the printing surface based on readings from the at least one non-audio sensor, and autonomously repositioning the autonomous moving apparatus to the print start location prior to printing the media. For example, when the desired image is to be printed in the center of a page, the apparatus may move itself to the center of the page, prior to the start of printing. The resulting image is thus printed precisely and without potential for error resulting from manual placement of the apparatus on the printing surface.

In another implementation according to the second aspect, the triggering event is capturing of an image with the image sensor. For example, when a voice command is received to print an image, the apparatus identifies the most recently captured image, and selects it for printing. Advantageously, the apparatus is thus able to integrate the capturing of images with its printing function, without requiring an external data source for supplying the image to be printed.

In another implementation according to the second aspect, the triggering event is capturing an image of a blank signature line on a document, and the printed media comprises a signature. The apparatus is thus capable of recognizing a location on a page for a signature, and of printing the signature at the correct location.

In another implementation according to the second aspect, the triggering event is detection by the at least one non-audio sensor of placement of the autonomous moving apparatus onto the printing surface. The placement of the apparatus onto a printing surface thus serves as a kind of wake-up alert to the apparatus, to be prepared to print material that was recently sent to it or recently imaged. Optionally, the triggering event is detection of placement of the autonomous moving apparatus onto the printing surface within a predetermined time following capturing of an image with the image sensor. In such cases, the placement of the apparatus onto the printing surface soon after capturing an image specifically indicates to the apparatus to be prepared to print the captured image. In some such embodiments, the apparatus prints the captured image even without a command by the user.

In another implementation according to the second aspect, the method further comprises: in response to a voice command instructing capturing an image of an object with the image sensor, locating the object, determining whether the image sensor is capable of imaging the object at a desired size and resolution from its position, and, upon a determination that the image sensor is not able to image the object at the desired size and resolution, autonomously repositioning the autonomous moving apparatus prior to capturing the image. Advantageously, the apparatus autonomously moves in order to obtain a shot of the desired size and resolution, without requiring the user to reposition the apparatus manually.

In another implementation according to the second aspect, the media is a plurality of markings on the printing surface, and each respective pair of markings is separated by the same interval. In some such implementations, the distance sensor is used to measure distances, and the printing head is used to mark off the distances. Advantageously, the apparatus is thus able to accurately measure and mark distances, providing an additional useful function.

According to a third aspect, a method of printing with an autonomous moving apparatus is disclosed. The autonomous moving apparatus comprises a handheld housing adapted to contain a printing head and an actuating mechanism adapted to move the housing on top of a printing surface. The method comprises: selecting an image to be printed from a memory of a computing device; requesting from a user whether to print the images; and, upon receipt of an instruction from the user to print the image, printing the image with the autonomous moving apparatus. In such implementations, the apparatus may be connected via a wireless network to an application installed on the computing device, and the application contains computer-executable instructions to perform the selecting step. Rather than using the wireless network only for passive transmission of instructions to print an image, the application takes an active role in identifying content to be printed, thereby saving the user time and mental effort.

In another implementation according to the third aspect, the method further comprises selecting the image based on at least one of temporal proximity to an acquisition of the image by the computing device and temporal proximity to an electronic calendar entry associated with the image. In the first scenario, the application recognizes acquisition of the image, for example, through either capture of the image by a built-in camera of the computing device or through receipt of the image by electronic communication. The application identifies the image as a recently captured image and prompts the user whether he or she wishes to print it. In the second scenario, the application is integrated with a calendar function on the computing device. The application recognizes an image associated with a calendar event and prompts the user whether he or she wishes to print it.

In another implementation according to the third aspect, the method further comprises selecting the image based on display of the image on a display of the computing device. For example, opening an image to full screen may signal to the application that the user may be interested in printing the image. The application accordingly prompts the user.

In another implementation according to the third aspect, the method further comprises selecting the image to be printed based on an instruction from the user. For example, the user may issue a voice command or a command from a keyboard to print a particular image.

According to a fourth aspect, a mobile robotic device is disclosed. The mobile robotic device includes a handheld housing; and at least one actuating mechanism adapted to move the housing on top of the surface. Within the handheld housing, the device includes at least one sensor selected from a group comprising an audio sensor, an image sensor, a touch sensor, and a distance sensor; a printing head; and a speaker. Processing circuitry is adapted to execute a code for: receiving inputs from the at least one sensor; based on the inputs, determining a pattern for movement of the housing at least one of prior to and during operation of at least one of the printing head, speaker, audio sensor, image sensor, and distance sensor, and instructing the at least one actuating mechanism to move the housing in the determined pattern. Advantageously, the mobile robotic device is able to improve the performance of the printing head, speaker, audio sensor, and image sensor by moving the housing prior to or during operation of those devices. For example, the audio sensor and image sensor can track a person walking around the room; the distance sensor can measure specific distances, the printing head is capable of printing on a particular location on a surface; and the speaker is able to direct its sound to a location where a user is listening. Furthermore, the robotic device combines multiple useful functions in one compact housing, making the robotic device useful and practical.

In another implementation according to the fourth aspect, the mobile robotic device further includes at least one utility port configured to receive therein a removable cartridge containing a tool. The processing circuitry is adapted to execute a code for determining a pattern for movement of the housing at least one of prior to and during operation of the tool, and instructing the at least one actuating mechanism to move the housing in the determined pattern. For example, the tool may be instructed to operate in a straight line, or in a polygonal pattern. Optionally, the tool is selected from a group comprising a writing implement, a laser, a cutting blade, an imprinting tool, and a sewing tool. Advantageously, including the tool within the same robotic device further increases the functionality of the device and makes the device more useful to a user.

In another implementation according to the fourth aspect, the mobile robotic device includes an extender for a wireless network. Upon a determination that the extender receives a wireless signal at insufficient strength, the processing circuitry is configured to instruct the at least one actuating mechanism to move the housing in a direction toward a source of the wireless signal. Advantageously, including the wireless extender within the same robotic device further increases the functionality of the device and makes the device more useful to a user.

In another implementation according to the fourth aspect, the processing circuitry is configured to receive inputs from the at least one sensor during operation of the speaker, and, based on the inputs from the at least one sensor, determine a location to which to move the housing in order to improve audio quality, and instruct the at least one actuating mechanism to move the housing in the determined direction. The improvement in audio quality may be based on, for example, movement to a location with greater acoustic quality, or movement closer to a user listening to the speaker. Advantageously, the robotic device is thus able to improve the performance of the speaker during use.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments, relates to an autonomous moving apparatus, and more specifically, but not exclusively, to an autonomously moving personal robotic device that is capable of moving and printing on a surface.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring to FIGS. 1A-1D and FIG. 8, autonomous moving apparatus 10 is a multifunctional personal robotic device. As used in the present disclosure, the terms "autonomous moving apparatus," "apparatus," and "mobile robotic device" are used interchangeably. Apparatus 10 includes various components suitable for printing an image 14 on a printing surface 12. Image 14 is also referred to herein as printed media.

Apparatus 10 has a handheld housing in which the components recited below are contained. In the embodiments of FIGS. 1A-1D, the housing is substantially cube-shaped or cuboid-shaped. These shapes are merely exemplary, and other forms are also possible. In certain exemplary embodiments, the housing is shaped substantially like a teardrop. Optionally, the housing is shaped like one of the embodiments depicted in U.S. Pat. No. D736,312, the contents of which are incorporated by reference as if fully set forth herein.

Figure 8:
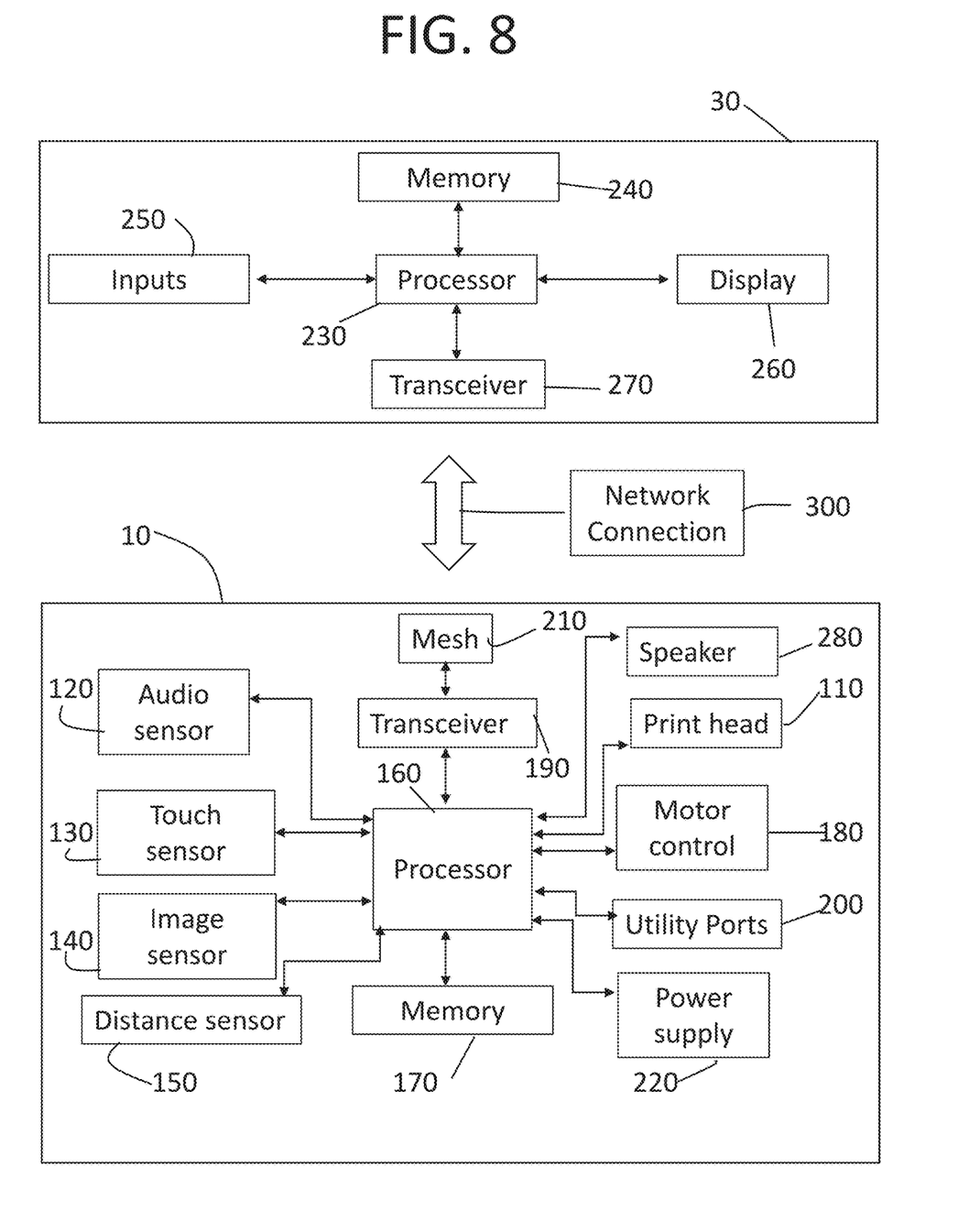
FIG. 8 is a schematic block diagram of the autonomous moving apparatus of FIG. 1A-1D, a computing device, and a network, according to embodiments of the present disclosure.

Referring specifically to FIG. 8, apparatus 10 includes at least one print head 110. Print head 110 includes one or more ink cartridges containing ink for printing, and micro-nozzles for depositing the ink onto a printing surface. The ink cartridges may be removable and replaceable. There may be a plurality of ink cartridges for printing in both black and color. For example, there may be black, magenta, cyan, and yellow colored ink cartridges. Print head 110 may additionally or alternatively be compatible with other types of printing and depositing technology, for example, laser printing, thermal printing, coating, or laminating.

Processing circuitry 160 is connected to the print head 110. Processing circuitry 160 may include a computer readable storage medium (or media), such as memory 170, having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the processing circuitry 160, partly on the processing circuitry 160, as a stand-alone software package, partly on the processing circuitry 160 and partly on a remote computer or entirely on the remote computer or server. In the latter scenario, the remote computer may be connected to the processing circuitry 20 through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Motor control 180 is configured to receive commands from the processor 160 to actuate a drive mechanism. The drive mechanism is also referred to herein as an actuating mechanism adapted to move the housing. The drive mechanism is capable of propelling the apparatus 10 in a plurality of directions on top of a surface, such as linearly, diagonally, or in an arc. The drive mechanism may include one or more wheels. The drive mechanism may also include, for example, a traction chain. The drive mechanism may be comprised of multiple mechanisms for moving in different directions, for example, two different movement systems for moving on an X-axis and a Y-axis. Alternatively, the drive mechanism is comprised of a single omnidirectional wheel.

Apparatus 10 further includes audio sensor 120 and one or more non-audio sensors, such as image sensor 130, touch sensor 140, and distance sensor 150. The non-audio sensors are used by the apparatus 10 to gather data, especially data suitable for the functions of image collection, locomotion, and printing.

The audio sensor 120 includes a microphone. The processing circuitry 160 includes a voice-recognition software that is configured to recognize a user's speech and to implement orally-communicated commands. The image sensor 130 may also be used to identify the user through facial recognition. Upon identifying the user through voice recognition, facial recognition, or a combination thereof, the processing circuitry 160 may activate a personal profile for that user, and automatically perform certain actions according to that user's pre-programmed preferences. For example, the processing circuitry may activate certain functions, or move the apparatus 10 to a designated location on a desk. Optionally, the processing circuitry 160 includes an artificial intelligence (AI) chip capable of machine learning, which allows the apparatus 10 to improve its understanding of the user's requests.

Image sensor 130 may include one or more cameras, CMOS sensors, charge-coupled devices (CCDs), or the like. The image sensor 130 may capture any wavelength of light, such as light in the visual, ultra-violet, or infra-red spectra. The image sensor 130 is used to image items, such as items that are to be copied or printed, or identify people, such as particular users. The image sensor 130 may also be used to locate edges of a printing surface and to communicate information to the processor regarding the positioning of the apparatus 10 on the printing surface. Image sensor 130 may include a color sensor, such that the apparatus 10 may determine the boundaries of a printing surface through detection of a change in color.

Touch sensor 140 may operate according to any operating principle of a touch sensor known to those of skill in the art, for example, a capacitive sensor, a resistive sensor, an infrared sensor, and a surface acoustic wave (SAW) sensor. The touch sensor 140 is used to identify a surface that is suitable for printing and to determine the dimensions and boundaries of this surface.

The distance sensor 150 is used to measure motion of the apparatus 10 and to accurately measure distance traveled by the apparatus 10. Distance sensor 150 may include one or more of an optical flow sensor, an encoder, or an accelerometer. Using the combined inputs of the image sensor 130, touch sensor 140, and distance sensor 150, the processing circuitry 160 is able to identify a location of the apparatus 10 relative to a printing surface, and to generate directions to the motor control 180 and the print head 110 to pilot the apparatus 10 and print an image onto the printing surface. When the processing circuitry 160 includes an AI chip, the AI chip enables the apparatus 10 to improve and advance its maneuvering, such as to navigate in the most efficient manner, and avoid obstacles.

Reference to a printing surface in the functioning of the image sensor 130, touch sensor 140, and distance sensor 150 is merely exemplary, and those sensors may similarly be used to determine information about any work surface upon which apparatus 10 operates, for example, in the performance of a mechanical function, as well as any surface that the apparatus 10 is located on, for example, for the purpose of locomotion.

A power supply 220 supplies power to apparatus 10. Power supply 220 may be any conventional source of power, for example, a rechargeable battery.

In a preferred embodiment, apparatus 10 includes a transceiver 190. Transceiver 190 is capable of communicating wirelessly via network 300 to a computer 30. The wireless communication may proceed via any communications protocol that is known or that may become known, for example, Wi-Fi, Bluetooth, Bluetooth Low Energy, or radio frequency (RF). Computer 30 may be any form of computing device, including, for example, a desktop computer, a laptop computer, a mobile phone, a tablet, a smart watch, smart glasses, a smart speaker, or even another apparatus 10. Computer 30 includes processing circuitry 230, memory 240, inputs 250

(for example, mouse, keyboard, or voice activated inputs), a display 260, and a transceiver 270. The processing circuitry 230 and memory 250, may have similar features to processing circuitry 160 and memory 170 discussed above, and may have a software application installed thereon for communicating with apparatus 10. The user may communicate instructions to apparatus 10 via inputs 250, which are transferred to processor 160 via transceiver 270 and transceiver 190.

In alternative embodiments, apparatus 10 communicates with computer 30 via a wired connection, such as a USB cable. It should be recognized, however, that the apparatus 10 is capable of performing many of the functions described herein without any data connection to another computing device.

In exemplary embodiments, the autonomous moving apparatus 10 is used for printing or imprinting on a printing surface. The printing surface may be any surface capable of printing or imprinting thereon, such as paper, poster board, cloth, tiles, wood, concrete, shelves, tabletops, or floors.

One exemplary process for receiving an instruction to print and printing with the apparatus 10 is as follows. A user communicates a voice command to the apparatus 10 to print. The sound from the user is received by the audio sensor 120 and is determined by processor 160 to be a voice command. In response to the voice command, the processor 160 analyzes readings of the non-audio sensors (e.g. image sensor 130, touch sensor 140, and distance sensor 150) to identify a triggering event. As used in the present disclosure, the term "triggering event" refers to any event associated with either an image to be printed and/or a preparation of the apparatus 10 to print. The triggering event thus may be a capture of an image with the image sensor, or a display of an image on display 260 of computing device 30. The triggering event may also be, for example, placement of the apparatus 10 on a printing surface, e.g., a piece of paper. The processing circuitry 160 may determine, through input from the non-audio sensors, that the apparatus 10 is on a piece of paper, and prepare to print an image on that paper.

In response to the detection of the triggering event, the processing circuitry 160 instructs the actuating mechanism 180 such that the housing moves along a printing pattern associated with the triggering event. For example, the printing pattern may be sized to match the dimensions of the paper on which the apparatus 10 is placed. Thus, if a user instructs printing of a file sized for 8.5"×11" paper, and the apparatus 10 is placed on 8"×10" paper, the processing circuitry may resize the file to fit properly on the smaller paper. The processing circuitry 160 may also resize certain files whose contents suggest that they should be printed on one sheet of paper, for example, a shopping list. In addition or alternatively, the printing pattern may be sized to match the contours of an image captured by the image sensor 130. For example, an image of a receipt would be printed with the same dimensions as the receipt itself, even if it were printed on a piece of paper that is wider than the original receipt.

The processing circuitry 160 instructs the printing head 110 to print media extracted from the readings of the non-audio sensors, selected according to an analysis of the readings. Advantageously, although the apparatus 10 is capable of printing specific files that are sent to it, in the manner of a conventional printer, it is also capable of intelligently identifying and selecting both the material that is to be printed and the location on the printing surface on which the material is to be printed, based on the sensor readings. In this manner, apparatus 10 identifies media to be printed autonomously.

In alternative embodiments, the user's instruction includes a voice command to both capture an image and then print the image.

In addition, although in the embodiments described above the processing circuitry 160 prints in response to a voice command, in other embodiments the processing circuitry 160 prints in response to an electronic command. For example, the user may communicate a printing command from a computer or mobile electronic device 30 that is electronically connected to processing circuitry 160.

In still other embodiments, the apparatus 10 prints without any direct command. For example, the processing circuitry 160 may be programmed to print whenever the apparatus 10 is placed on a printing surface within a predetermined time period after capturing an image with the image sensor 130. The apparatus 10 may also automatically print whenever it captures a certain type of image, or whenever it is placed on a certain type of printing surface. In still other embodiments, the user may instruct the apparatus 10 to capture an image, and then the apparatus 10 autonomously prints the image. The capturing of the image may also proceed autonomously, or at the initiative of the processing circuitry 160. For example, the apparatus 10 may recognize a user holding up an image for capturing, and automatically suggest to the user to scan it and print it. Through the artificial intelligence functions described above, the apparatus 10 may adapt to a user's preferences with regard to when the user wishes to capture an image and when the user wishes to print.

Returning to FIGS. 1A-1D, during the printing process, the processing circuitry 160 may cause the motion of the housing over the printing surface 12 to proceed in an efficient path that avoids circuitous passing over areas that are not to be printed, as well as avoiding passage over recently printed areas to avoid smearing.

Figure 1A:
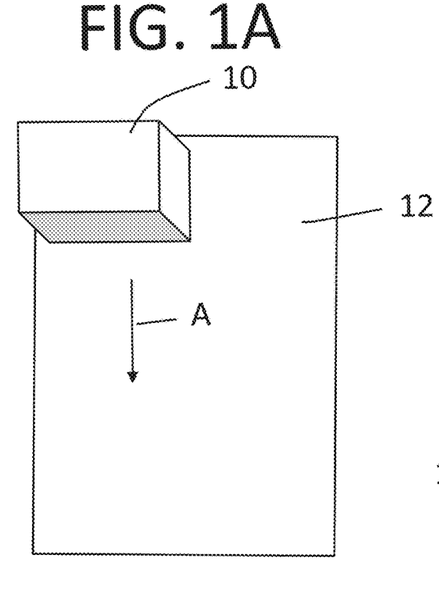
FIGS. 1A-1D depict printing of an autonomous moving apparatus printing an image on a blank printing surface, according to embodiments of the present disclosure.
Figure 1B:
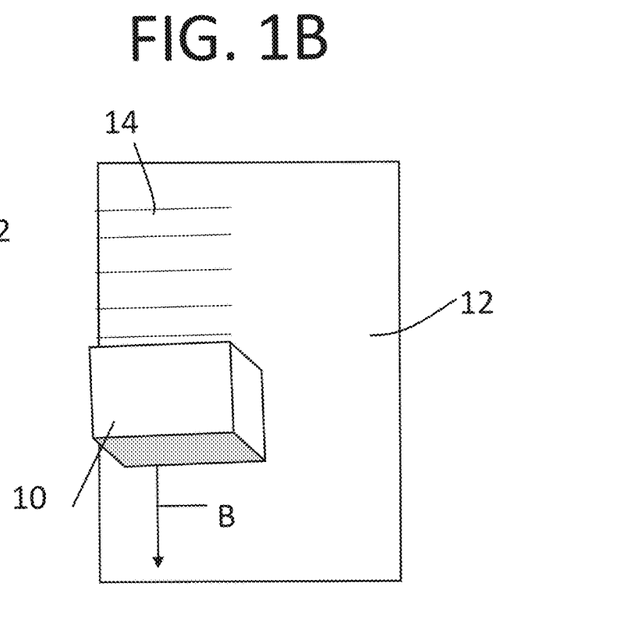
Figure 1C:
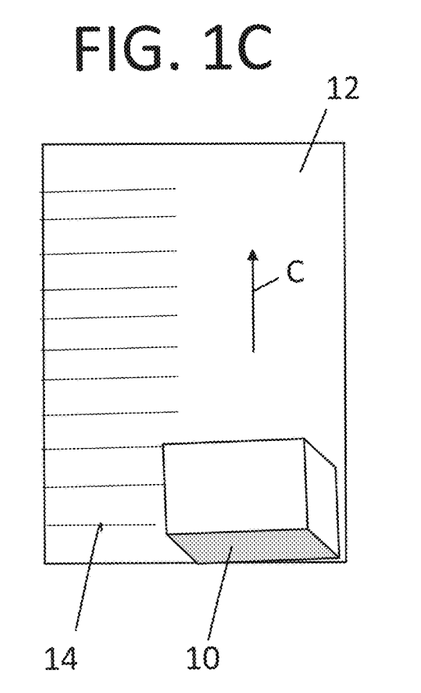
Figure 1D:
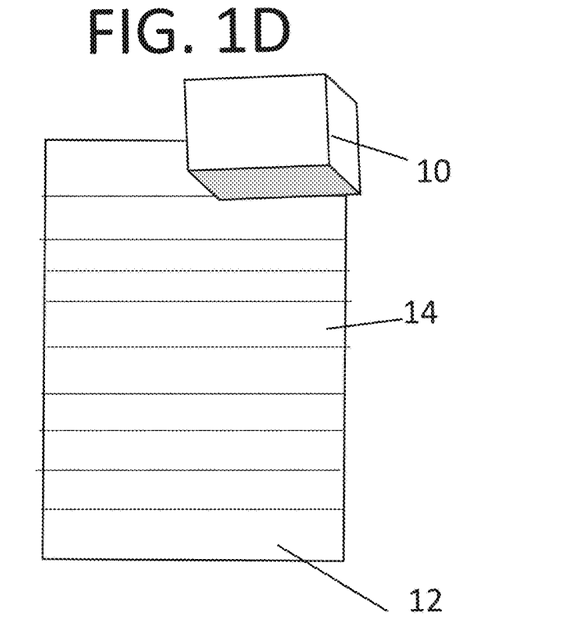

As shown in FIG. 1A, apparatus 10 is initially positioned at the upper left corner of a printing surface 12. In the illustrated embodiments, printing surface 12 is a page. Upon receiving printing instructions, the apparatus 10 moves down the long dimension of the page, in the direction of arrow A, printing at the maximum possible width of the ink cartridge that is installed in apparatus 10. FIG. 1B shows the apparatus after printing to the middle of the page 12, leaving a partially completed image 14, and continuing to print in the direction of arrow B. FIG. 1C shows the position of the apparatus 10 after printing the entire first drive of the page 110, and then, under the control of the processing circuitry 160, moving across the page and printing in the opposite direction, i.e., in the direction of arrow C. FIG. 1D shows the apparatus 10 at its resting point after completion of printing two "lines", i.e., 2 drives that print the maximum possible width of the ink-cartridge that is installed in the apparatus 10. While in the illustrated embodiment the apparatus 10 prints in a direction parallel to the long dimension of the page, the apparatus 10 may alternatively print in a direction parallel to the short dimension of the page.

Figure 2A:
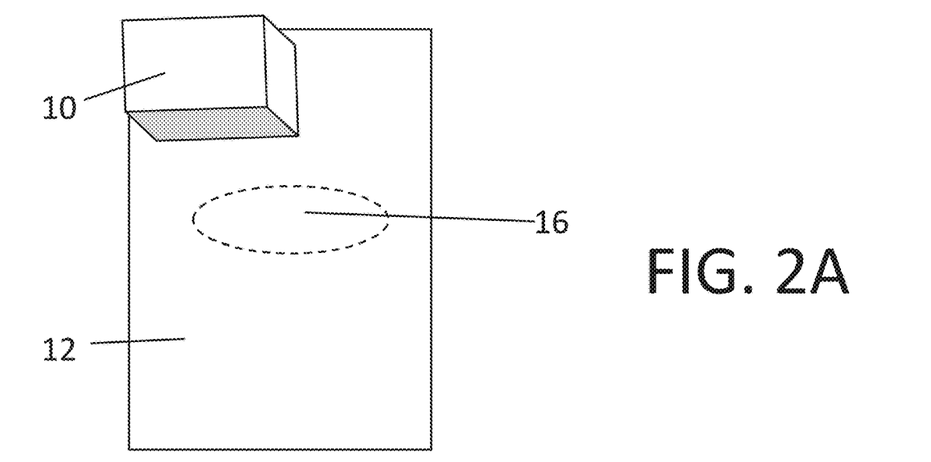
FIGS. 2A-2C depict the autonomous moving apparatus of FIGS. 1A-1D printing an image on a surface having a previously printed image, according to embodiments of the present disclosure.
Figure 2B:
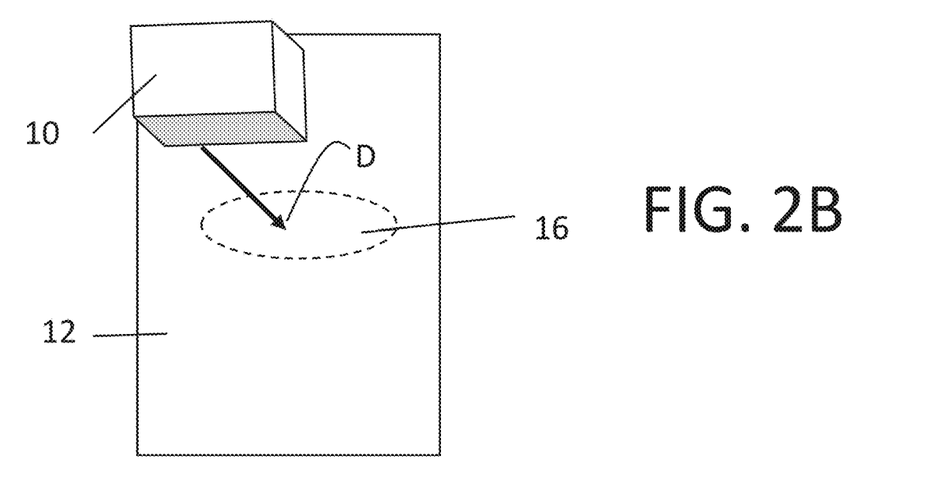
Figure 2C:
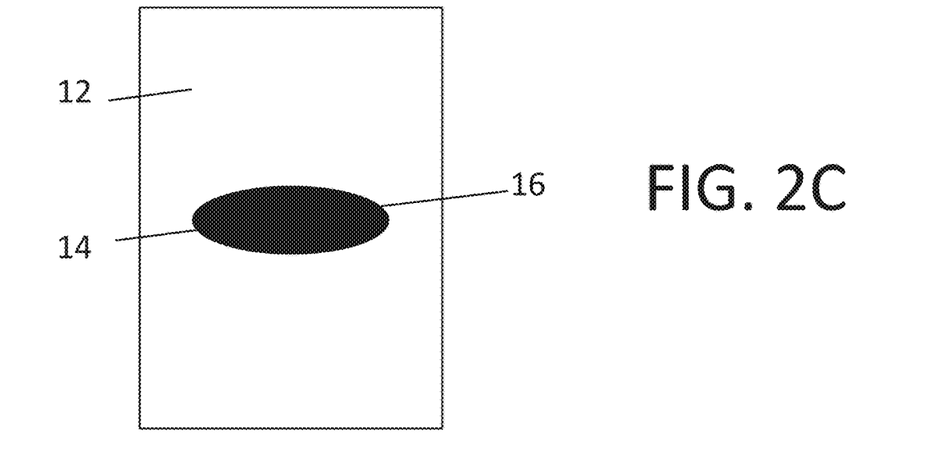

FIGS. 2A-2B illustrate the capability of apparatus 10 to identify a previously printed image on the printing surface, based on readings from the non-audio sensors, and to autonomously position the apparatus 10 so as to align the printed media in relation to the previously printed image. In FIG. 2A, the apparatus 10 is instructed to print an image 14 on printing surface 12 which already contains a printed image 16. In the illustrated embodiments, the printed image 16 is an open ellipse, and the apparatus is instructed to fill in the ellipse. In FIG. 2B, the apparatus 10 determines a print start location suitable for filling in the ellipse, and autonomously moves along arrow D to that location. As shown in FIG. 2C, the resulting printed image 14 is aligned with the previously printed image 16. Advantageously, the repositioning of the apparatus 10 to the print start location is performed autonomously, without potential for error resulting from manual placement of the apparatus on the printing surface.

Figure 3A:
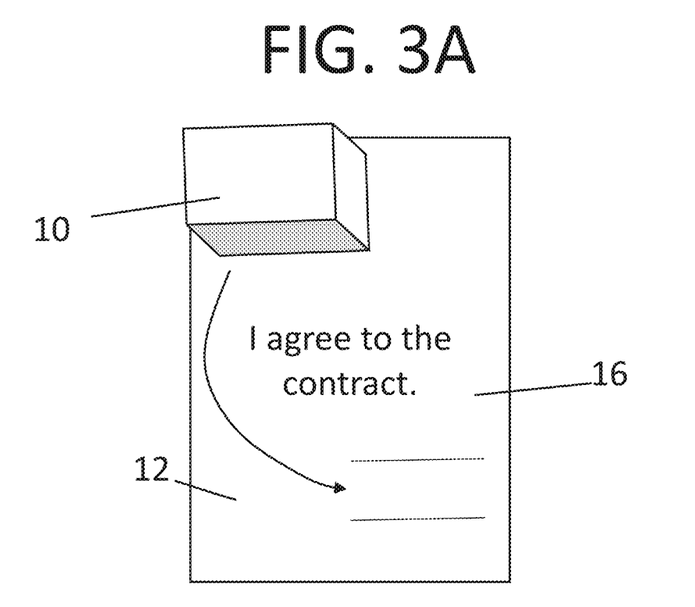
FIGS. 3A-3B depict the autonomous moving apparatus of FIGS. 1A-1D printing a signature on a blank signature line, according to embodiments of the present disclosure.
Figure 3B:
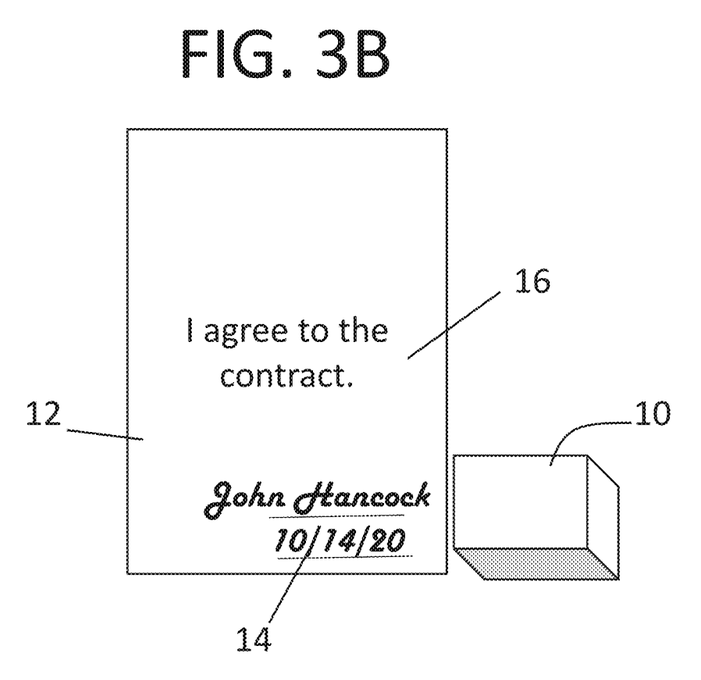

A special example of this process is illustrated in FIGS. 3A and 3B. In FIG. 3A, apparatus 10 is placed on a surface 12 that includes a preexisting image 16 of text and signature lines. The user instructs apparatus 10 to print a signature and date 14 on the signature lines. As discussed above, the user may instruct the printing prior to placing the apparatus 10 on surface 12, or after placing the apparatus 10 on surface 12. Alternatively, the apparatus 10 may autonomously begin printing after being placed on surface 12 and recognizing the blank signature lines. Regardless, the processing circuitry 160 recognizes the capturing of the blank signature lines as a triggering event, and determines a printing pattern associated with the signature lines. In FIG. 3B, the apparatus 10 prints the signature and date 14 on the signature lines.

Figure 4A:
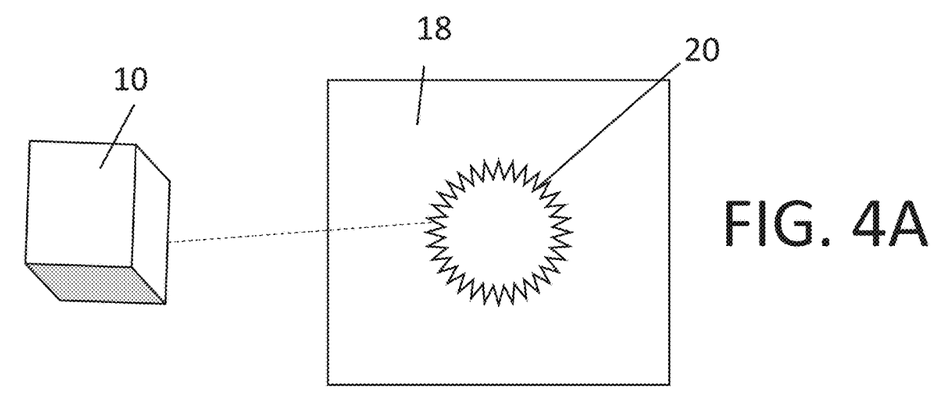
FIGS. 4A-4C depict the autonomous moving apparatus of FIGS. 1A-1D capturing an image with an image sensor and printing the image onto a blank printing surface, according to embodiments of the present disclosure.
Figure 4B:
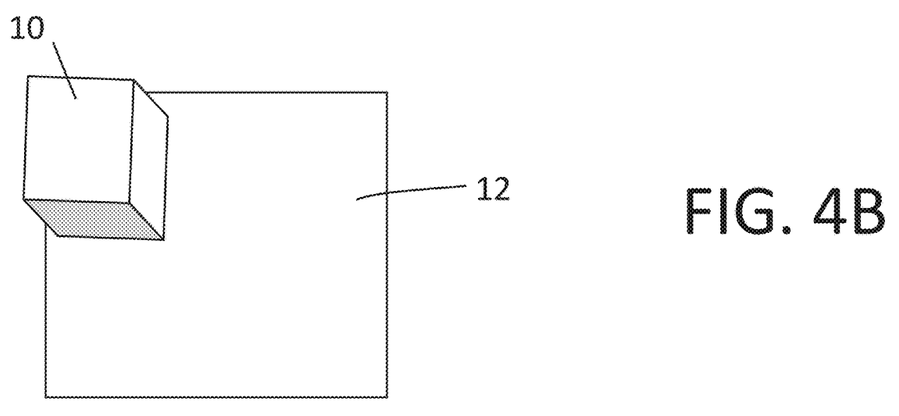
Figure 4C:
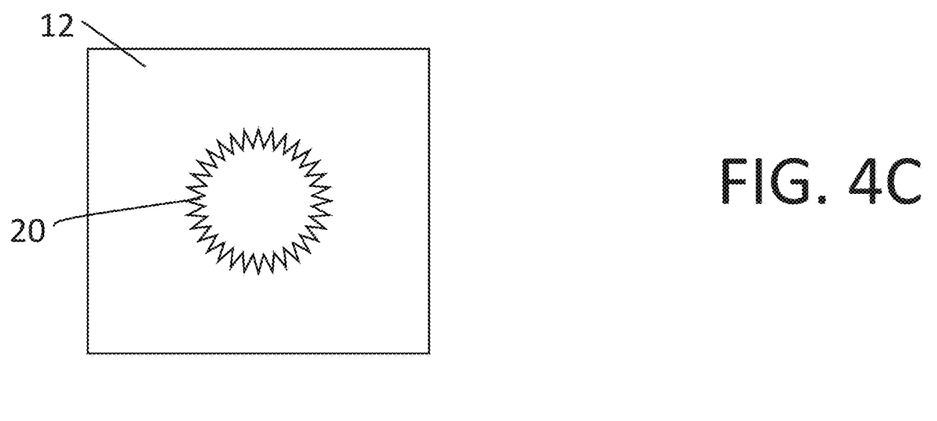

FIGS. 4A-4C illustrate a process of capturing an image 20 with the image sensor 130 and printing the image 20. As illustrated in FIG. 4A, the user may instruct the apparatus 10 to capture an image of page 18. The processing circuitry may recognize that page 18 displays pattern 20. Alternatively, the user may specifically instruct the apparatus 10 to focus on pattern 20. The capture of the image of page 18 and/or pattern 20 thus serves as a triggering event, in the manner described above. In FIG. 4B, the user places the apparatus 10 on a blank printing surface 12. In FIG. 4C, the apparatus 10 prints pattern 20 onto printing surface 12. As discussed above, apparatus 10 may print autonomously, for example, when placed onto printing surface 12 within a predetermined time period following capture of the image of pattern 20. Alternatively, the user may specifically instruct the apparatus 10 to print the captured image after placing apparatus 10 on surface 12.

Figure 5A:
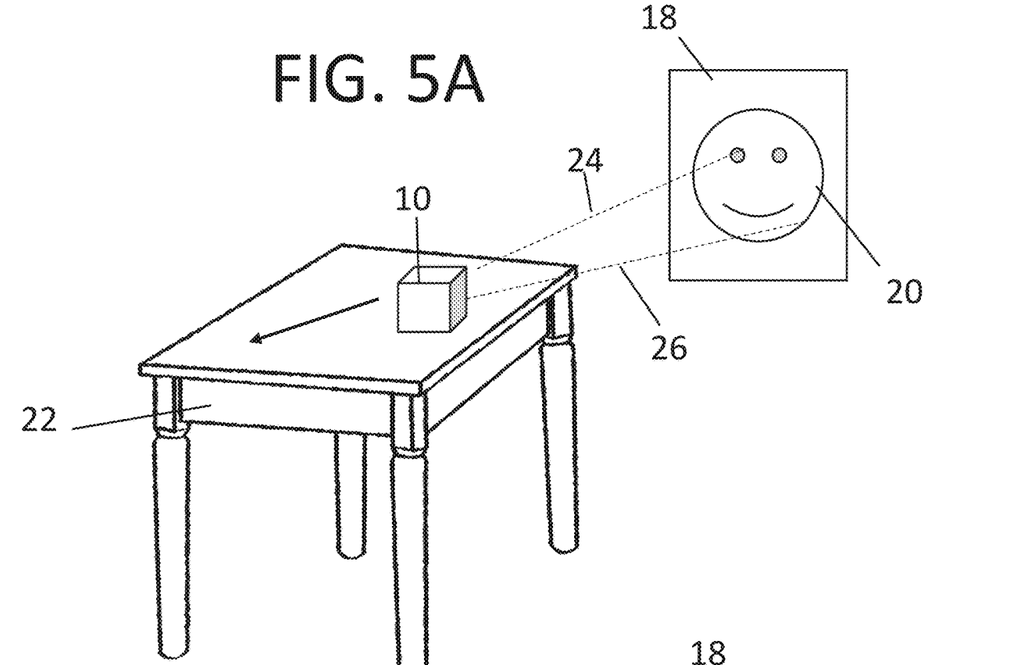
FIGS. 5A-5B depict the autonomous moving apparatus of FIGS. 1A-1D receiving a command to image an object, and autonomously repositioning itself so as to enable capturing an image at a desired size and resolution, according to embodiments of the present disclosure.
Figure 5B:
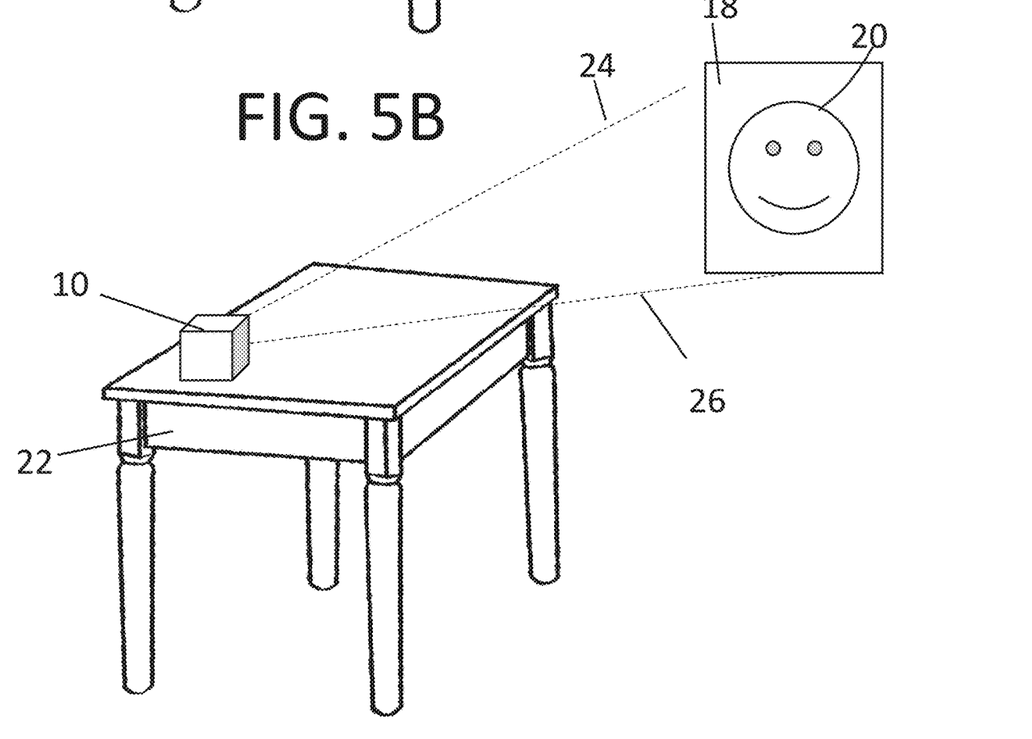

FIGS. 5A-5B illustrate a scenario in which apparatus 10 repositions itself autonomously in order to improve the quality of an image taken by image sensor 130. In FIG. 5A, the apparatus 10 receives a command, for example a voice command, to capture an image of pattern 20, which is located on surface 18. The apparatus 10 is located sufficiently close to surface 18 that the field of view of the image sensor 130, which is represented by dashed lines 24 and 26, is not wide enough to capture the entire pattern 20 at a desired size and resolution. Processing circuitry 160 determines that image sensor 130 is not able to image the pattern 20 at the desired size and resolution from its current position, and repositions the apparatus 10 to a different position on table 22. In FIG. 5B, the processing circuitry determines that, from the new position, image sensor 130 is able to capture the entire pattern 20 at the desired size and resolution, and captures the image.

In the embodiment of FIG. 5A, the pattern 20 is already partially in the field of view of the image sensor when the voice command to capture the image is received. In an alternative implementation, the pattern 20 is not in the field of view at all, and the apparatus 10 locates the pattern 20 to be imaged. For example, the voice command may instruct apparatus 10 to capture an image of a person that is talking. The processing circuitry, relying on the non-audio sensors and optionally on the audio sensor 120 as well, locates the talking person within the room, turns toward the position in which it can capture an image of that person, and captures the image. Apparatus 10 may also move while capturing the image. For example, apparatus 10 may capture a video of a talking person and follow the movement of the person as he or she is talking. Optionally, apparatus 10 is equipped with facial recognition software that can also identify the person whose image is to be captured.

Figure 6A:
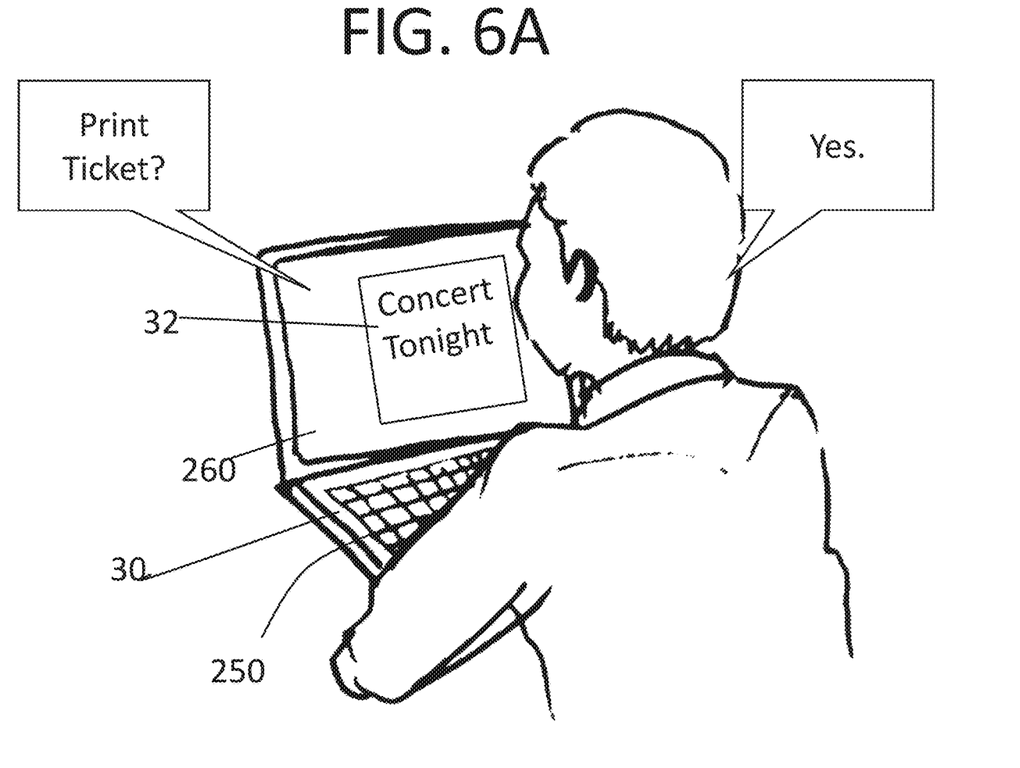
FIGS. 6A-6B depict a software application suggesting an item to print from a computing device, a user instructing to print the item, and the autonomous moving apparatus of FIGS. 1A-1D printing the item, according to embodiments of the present disclosure.
Figure 6B:
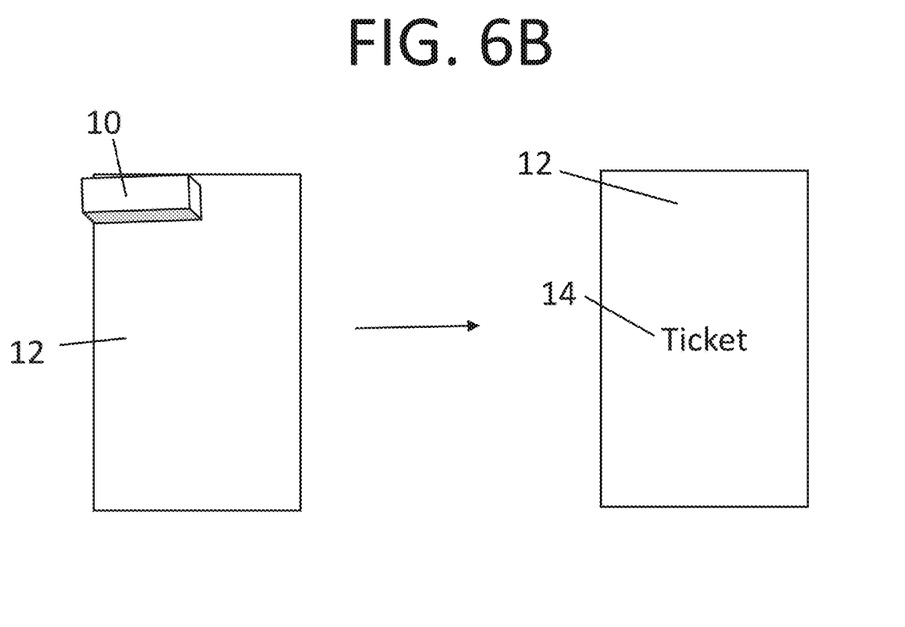

FIGS. 6A-6B illustrate a scenario in which apparatus 10 selects material to be printed from a computer 30 having a networked connection with apparatus 10. As discussed above in connection with FIG. 8, computer 30 includes a processing circuitry 230, a memory 240, inputs 250 (such as a keyboard and a microphone), and a display 260. The computer 30 runs a program that is integrate with apparatus 10. The program has access to the computer display 260 and memory 240, in order to select images to print. The computer 30 may also run one or more other programs in which images are stored or referenced. For example, in the embodiment illustrated in FIG. 6A, the computer is running a calendar program. The user has entered an event 32, such as a concert, for which an image of a ticket is associated. The processing circuitry 230 recognizes that the calendar event will occur soon, and prompts the user whether he or she wishes to print the ticket. The user voices a command to print the ticket, and apparatus 10 prints an image 14 of the ticket on printing surface 12.

In the embodiment of FIG. 6A, the image is selected for printing based on temporal proximity to the electronic calendar entry 32 associated with the image. In an alternative scenario, the image is selected for printing based on temporal proximity to an acquisition of the image by the computer 30. For example, the user may open an email with an image attachment, and the program may immediately prompt the user regarding whether he or she wishes for the attached image to be printed. Alternatively, the computer program may identify the image to be printed based on a display of the image on the display 260. For example, when a user opens the image to a full-screen display on the computer screen, the program may automatically inquire from the user whether he or she wishes to print the image. In still other scenarios, the user may place the apparatus 10 on a printing surface when an image is being displayed on the display 260, and the apparatus 10 prompts the user regarding whether to print the image. As discussed above, the computer program may use artificial intelligence to learn a user's printing preferences.

In still other scenarios, the user may select an image to be printed and send the image to the apparatus 10 for printing, without prior prompting by apparatus 10. For example, the user may issue a voice command or a command from a keyboard to print a particular image. In some such scenarios, the user makes a request for a printable file, and the computer program finds or fetches the file and prints it. For example, the user may recite "print my last receipt," or "print my last email with the attachment," or "print a drawing of Spiderman." Alternatively, the computing device 30 displays a message that has the words "please print," and the computer program recognizes the file to be printed, and instructs the apparatus 10 to print it.

In embodiments in which functioning of the apparatus 10 and computing device 30 is integrated, processing on the apparatus 10 may be limited. In such embodiments, most of the processing is performed on the computing device 30, for example, an appropriate driver that operates with respect to apparatus 10. Advantageously, the processing circuitry 160 and memory 170 of apparatus 10 may therefore be smaller, allowing apparatus 10 to occupy a smaller volume and to be produced at lower expense.

Figure 7A:
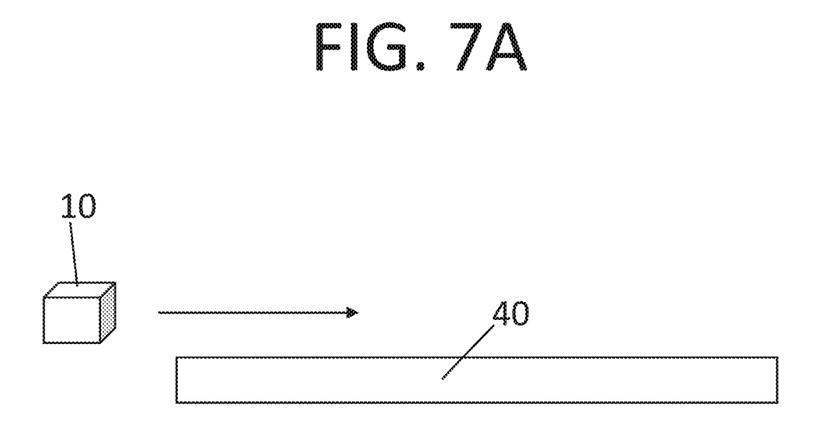
FIGS. 7A-7B depict the autonomous moving apparatus of FIGS. 1A-1D measuring and marking intervals on a printing surface.
Figure 7B:
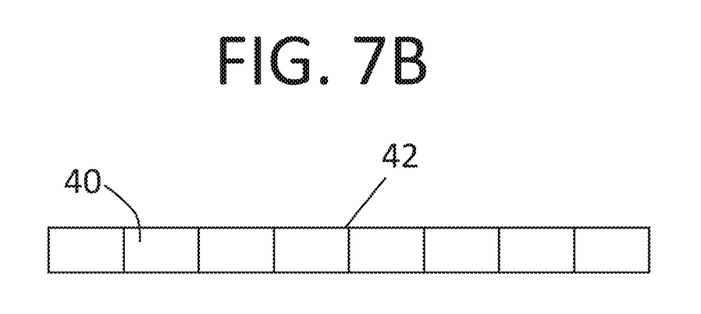

FIGS. 7A-7B illustrate apparatus 10 being used to measure and mark intervals. As shown in FIG. 7A, the user sets apparatus 10 on printing surface 40 and instructs it to measure and mark intervals. For example, the user may instruct to mark intervals 5 cm apart across the length of the surface 40. In such scenarios, the user may be a carpenter, and the printing surface may be a piece of wood. As shown in FIG. 7B, using distance sensor 150, the apparatus measures the distances, and using the printing head 110, the apparatus 10 prints markings 42 at equal intervals along printing surface 40. Markings 42 may take any other shape or configuration. For example, the user may instruct the apparatus 10 to draw a 2 cm×2 cm square, or a 1 cm solid line, or a dotted line. The apparatus 10 may also be used to measure accurate distances without leaving a marking. For example, a carpenter may place the apparatus 10 on a piece of wood and instruct it to drive 5 cm, and the apparatus 10 does so.

Referring again to FIG. 8, apparatus 10 may optionally include additional functionalities. For example, apparatus 10 may include one or more utility ports 200. Utility ports 200 may have operative connections to tool cartridges, such as cartridges for an imprinting tool, a sewing tool, a cutting blade, a laser, or a crayon or other writing implement. The cartridges may be modular, such that the same utility port 200 may be used for multiple types of cartridges. The apparatus 10 may recognize the type of cartridge that is installed and suggest performance of a function associated with that cartridge. For example, when a user puts in a needle and thread cartridge, the apparatus 10 may suggest sewing a certain pattern, based on a previously sewed pattern. Conversely, the apparatus 10 may prompt the user to change the tool cartridge based on the type of surface on which the apparatus 10 is placed. For example, when the apparatus 10 is placed on cardboard, it may prompt the user to place a cutting blade in the utility port so that the blade can cut the cardboard. As another example, the apparatus 10 may associate placement on glass with use of a laser to cut the glass, or placement on wood with use of a laser to engrave or mark the wood.

Apparatus 10 may also include a Wi-Fi mesh system 210 operatively connected to the transceiver 190. Mesh system 210 is used as a mesh Wi-Fi network extender for a location such as a home. Processing circuitry 160, transceiver 190, and Wi-Fi mesh system 210 may be used as a satellite module to create a Wi-Fi network with dynamic routing. In such embodiments, the apparatus 10 may be physically wired to a network, such as a DSL network, or it may receive Wi-Fi signal wirelessly. The apparatus 10 may detect when the main Wi-Fi signal coming from a router is weak, and move or turn toward a router to enhance the signal that it receives.

Apparatus 10 may also include a speaker 280. The speaker 280 is used to issue audible requests to the user and audible confirmations to the user. The speaker 280 may also be used to play music. The processing circuitry 160 may receive information regarding which music files to play, for example, from a music streaming service. Processing circuitry 160 is also able to identify the user based on voice, image, and/or face recognition, and to access different music streaming accounts or playlists that are associated with the identified user. The processing circuitry 160 is also able to autonomously rotate or relocate the apparatus 10 in order to produce the highest sound quality. For example, the apparatus 10 may identify the location of a user in a room using the audio sensor 120 and/or the image sensor 130, and may rotate so that the speaker 280 faces the users. In another example, the apparatus 10 senses, with the audio sensor 120, that the sound is not being heard clearly, Apparatus 10 may determine that the cause of the poor sound quality is that the apparatus 10 is located in a corner of the room. Apparatus 10 then autonomously relocates out of the corner to a different location, from which the sound is heard more clearly.

In still another functionality of apparatus 10, the apparatus 10 may be used as a camera and microphone for videoconferencing. The video conference application may run on another device, for example, computing device 30. Image sensor 140 and audio sensor 120 take the place of a microphone and camera of computing device 30. The captured images and audio are stored on memory 170 of apparatus 10 and/or transmitted to computing device 30, from which they are further transmitted using the video conference application. Because apparatus 10 is mobile, it advantageously may be used to follow one or more users moving around a room during the videoconference.

It is expected that during the life of a patent maturing from this application many sensors, wireless communication protocols, and utility tools will be developed that are suitable for the functions described herein, and the scope of the terms sensor, wireless communication protocol, and utility tools intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An autonomous moving apparatus, comprising:
a handheld housing adapted to contain:
   a printing head;
   an actuating mechanism adapted to move the housing on top of a printing surface;
   an audio sensor;
   at least one non-audio sensor selected from a group comprising a distance sensor, a touch sensor, and an image sensor; and
a processing circuitry adapted to execute a code for:
   analyzing an audio signal captured by the audio sensor to detect a voice command;
   in response to the detection of the voice command, analyzing readings of at least one non-audio sensor to identify a triggering event; and
   in response to the detection of the triggering event, instructing the actuating mechanism such that the housing moves along a printing pattern associated with the triggering event, and instructing the printing head to print media extracted from the readings, selected according to an analysis of the readings.

2. The autonomous moving apparatus of claim 1, wherein the processing circuitry is adapted to identify a previously printed image on the printing surface based on readings from the at least one non-audio sensor, and to autonomously position the autonomous moving apparatus so as to align the printed media in relation to the previously printed image.

3. The autonomous moving apparatus of claim 1, wherein the processing circuitry is configured to identify a print start location on the printing surface based on readings from the at least one non-audio sensor, and to autonomously reposition the autonomous moving apparatus to the print start location prior to printing the media.

4. The autonomous moving apparatus of claim 1, wherein the triggering event is capturing of at least one of:
   an image with the image sensor, and
      an image of a blank signature line on a document, and the printed media comprises a signature.

5. The autonomous moving apparatus of claim 1, wherein the processing circuitry is further adapted to execute a code for: in response to a voice command instructing capturing an image of an object with the image sensor, locating the object, determining whether the image sensor is capable of imaging the object at a desired size and resolution from its position, and, upon a determination that the image sensor is not able to image the object at the desired size and resolution, autonomously repositioning the autonomous moving apparatus prior to capturing the image.

6. The autonomous moving apparatus of claim 1, wherein the media is a plurality of markings on the printing surface, wherein each respective pair of markings from the plurality of markings is separated by the same interval.

7. A non-transitory computer-readable medium comprising computer-executable instructions for:
   selecting an image to be printed from a memory of a computing device;
   requesting from a user whether to print the image; and
   upon receipt of an instruction from the user to print the image, printing the image with the autonomous moving apparatus of claim 1.

8. The non-transitory computer-readable medium of claim 7, further comprising computer-executable instructions for selecting the image based on at least one of temporal proximity to an acquisition of the image by the computing device and temporal proximity to an electronic calendar entry associated with the image.

9. The non-transitory computer-readable medium of claim 7, further comprising computer-executable instructions for selecting at least one of:
   the image based on display of the image on a display of the computing device, and
   the image to be printed based on an instruction from the user.

10. A method of printing with an autonomous moving apparatus, the autonomous moving apparatus comprising a handheld housing adapted to contain a printing head, an actuating mechanism adapted to move the housing on top of a printing surface, an audio sensor, and at least one non-audio sensor selected from a group comprising a distance sensor, a touch sensor, and an image sensor, the method comprising:
   analyzing an audio signal captured by the audio sensor to detect a voice command;
   in response to the detection of the voice command, analyzing readings of at least one non-audio sensor to identify a triggering event,
      in response to the detection of the triggering event, instructing the actuating mechanism such that the housing moves along a printing pattern associated with the triggering event; and
   instructing the printing head to print media extracted from the readings, selected according to an analysis of the readings.

11. The method of claim 10, further comprising identifying at least one of:
   a previously printed image on the printing surface based on readings from the at least one non-audio sensor, and autonomously positioning the autonomous moving apparatus so as to align the printed media in relation to the previously printed image;

a print start location on the printing surface based on readings from the at least one non-audio sensor, and autonomously repositioning the autonomous moving apparatus to the print start location prior to printing the media.

12. The method of claim 10, wherein the triggering event is capturing at least one of:
an image with the image sensor, and
an image of a blank signature line on a document, and the printed media comprises a signature.

13. The method of claim 10, wherein the triggering event is at least one of:
a detection by the at least one non-audio sensor of placement of the autonomous moving apparatus onto the printing surface,
a detection of placement of the autonomous moving apparatus onto the printing surface within a predetermined time following capturing of an image with the image sensor, and
a detection by the at least one non-audio sensor of placement of the autonomous moving apparatus onto the printing surface.

14. The method of claim 10, further comprising: in response to a voice command instructing capturing an image of an object with the image sensor, locating the object, determining whether the image sensor is capable of imaging the object at a desired size and resolution from its position, and, upon a determination that the image sensor is not able to image the object at the desired size and resolution, autonomously repositioning the autonomous moving apparatus prior to capturing the image.

15. The method of claim 10, wherein the media is a plurality of markings on the printing surface, wherein each respective pair of markings from the plurality of markings is separated by the same interval.

16. The method of claim 15, further comprising selecting the image based on at least one of temporal proximity to an acquisition of the image by the computing device and temporal proximity to an electronic calendar entry associated with the image.

17. The method of claim 15, further comprising selecting the image based on display of the image on a display of the computing device.

18. The method of claim 15, further comprising selecting the image to be printed based on an instruction from the user.

19. A method of printing with an autonomous moving apparatus, the autonomous moving apparatus comprising a handheld housing adapted to contain a printing head and an actuating mechanism adapted to move the housing on top of a printing surface, the method comprising:
selecting an image to be printed from a memory of a computing device;
requesting from a user whether to print the image; and
upon receipt of an instruction from the user to print the image, printing the image with the autonomous moving apparatus.

* * * * *